(12) United States Patent
Hayashi (10) Patent No.: US 6,963,761 B2
(45) Date of Patent: Nov. 8, 2005

(54) SYSTEM AND METHOD FOR SOUNDING A MUSIC ACCOMPANIED BY LIGHT OR VIBRATION

(75) Inventor: Keiichi Hayashi, Kanagawa (JP)

(73) Assignee: NEC Corporation, Tokyo (JP)

( * ) Notice: Subject to any disclaimer, the term of this patent is extended or adjusted under 35 U.S.C. 154(b) by 519 days.

(21) Appl. No.: 09/987,868

(22) Filed: Nov. 16, 2001

(65) Prior Publication Data

US 2002/0061772 A1 May 23, 2002

(30) Foreign Application Priority Data

Nov. 21, 2000 (JP) ........................... 2000-354552

(51) Int. Cl.⁷ ................................................ H04M 1/00
(52) U.S. Cl. ............. 455/567; 379/373.01; 379/373.02; 379/374.01; 379/374.03
(58) Field of Search ............................. 455/567, 414.1; 379/373.01, 373.02, 374.01, 374.03, 376.01, 373.04, 373.03

(56) References Cited

U.S. PATENT DOCUMENTS

| | | | |
|---|---|---|---|
| 4,753,148 A | | 6/1988 | Johnson |
| 5,835,863 A | * | 11/1998 | Ikenouchi et al. ........... 455/567 |
| 5,848,362 A | * | 12/1998 | Yamashita ................... 455/567 |
| 5,892,817 A | * | 4/1999 | Will ....................... 379/102.02 |
| 6,094,587 A | * | 7/2000 | Armanto et al. ............. 455/567 |
| 6,097,935 A | * | 8/2000 | Takahashi et al. ......... 455/186.1 |
| 6,216,017 B1 | * | 4/2001 | Lee et al. ................... 455/567 |
| 6,636,602 B1 | * | 10/2003 | Vlacancich ............ 379/374.01 |
| 2001/0023197 A1 | | 9/2001 | Shibata |
| 2002/0068597 A1 | * | 6/2002 | Scheel ........................ 455/550 |

FOREIGN PATENT DOCUMENTS

| | | |
|---|---|---|
| EP | 1 264 620 A1 | 12/2002 |
| GB | 2 367 723 A | 4/2002 |
| JP | 5-103053 | 4/1993 |
| JP | 06-104962 | 4/1994 |
| JP | A 9-191333 | 7/1997 |
| JP | WO 98/25397 | 6/1998 |
| JP | 10-173737 | 6/1998 |
| JP | 10-257131 | 9/1998 |
| JP | 11-023489 | 1/1999 |
| JP | 11-187089 | 7/1999 |
| JP | 11-242490 | 9/1999 |
| JP | 2000-059837 | 2/2000 |
| JP | 2000-075863 | 3/2000 |
| JP | 2000-504542 | 4/2000 |
| JP | 2000-134332 | 5/2000 |
| JP | 2000-196715 | 7/2000 |
| JP | A 2001-53839 | 2/2001 |
| JP | 2001-211237 | 8/2001 |
| JP | A 2001-274869 | 10/2001 |
| JP | A 2001-320447 | 11/2001 |
| WO | 01/19056 A1 | 3/2001 |
| WO | 02/00498 A1 | 1/2002 |

* cited by examiner

*Primary Examiner*—Huyen Le
*Assistant Examiner*—Tuan Pham
(74) *Attorney, Agent, or Firm*—Young & Thompson (57) ABSTRACT

Disclosed is a system for sounding a music accompanied by light including: a speaker for sounding a music including plural parts; a light emitter for emitting light; a driver for having the speaker sound the music, on the basis of music data of the music including the plural parts, the music data being included in play data containing both the music data of the music including the plural parts to be played by the speaker and designation data for designating a specific part among the plural parts, the specific part being to be accompanied by the light emitted from the light emitter; and turn-on/off a controller for turning the light emitter on or off in synchronization with a sound of the specific part, on the basis of the designation data for designating the specific part.

30 Claims, 6 Drawing Sheets

SYSTEM AND METHOD FOR SOUNDING A MUSIC ACCOMPANIED BY LIGHT OR VIBRATION

BACKGROUND OF THE INVENTION

1. Field of the Invention

The present invention relates to a handy phone terminal, and particularly to a handy phone terminal having a function of indicating reception of a call by a call-reception melody, light emitting means such as LED or the like and vibrating means such as a vibrator or the like. Further, the present invention relates to a method of indicating reception of a call by a call-reception melody, light emitting means such as LED or the like and vibrating means such as a vibrator or the like.

2. Description of the Prior Art

There are known some kinds of conventional handy phones each having a function of indicating reception of a call by simultaneously sounding a call-reception melody, lighting an LED and vibrating a vibrator when a call is received.

However, the call-reception melodies which can be sounded simultaneously with lighting an LED and vibrating a vibrator as described above are limited to fixed call-reception melodies registered with each handy phone terminal in advance, and data of pattern of turning-on/off the LED and the vibrator are required to be defined in conformity with these fixed call-reception melodies. Further, when a handy phone terminal downloads play data for making the handy phone play a call-reception melody from a server such as a WWW (World Wide Web) server by utilizing a network service using a network such as the Internet in order to make a call-reception sound on the basis of the downloaded play data at the call-reception time, the turn-on/off pattern of LED and the vibration pattern of the vibrator cannot be defined, and the LED and the vibrator lights and vibrates in simple pattern, so that reception of a call can be indicated to a user by only a monotonous pattern. Therefore, when the call-reception sound is eliminated, there occurs a problem that who is calling or what is received cannot be identified on the basis of the turn-on/off pattern of LED and the vibration pattern of the vibrator.

That is, with respect to the conventional handy phones, when a melody is sounded when a call or data are received, the turn-on/off pattern of LED and the vibration pattern of the vibrator can be operated with fixed patterns preset in the handy phone terminal or in synchronization with melody call-reception sounds registered with the handy phone terminal in advance. Therefore, with respect to the play data downloaded from a network, the LED and the vibrator cannot be operated in synchronization with the melodies of the downloaded play data, and only a single and monotonous pattern operation of the LED and the vibrator can be performed. Further, if a user eliminates the call-reception sound under the user's intention to identify a call originator on the basis of a melody played when a call is received, the call originator cannot be identified from LED and vibrator when the call is received, because the operation patterns of LED and the vibrator are simple.

SUMMARY OF THE INVENTION

In order to overcome the aforementioned disadvantage, the present invention has been made and accordingly, has an object to provide a handy phone terminal that makes a user to identify a call-reception type by not only a melody, but also light emitting device and/or vibrating device.

According to a first aspect of the present invention, there is provided a system for sounding a music accompanied by light comprising: a speaker for sounding a music comprising plural parts; light emitter for emitting light; means for having the speaker sound the music, on the basis of music data of the music comprising the plural parts, the music data being included in play data containing both the music data of the music comprising the plural parts to be played by the speaker and designation data for designating a specific part among the plural parts, the specific part being to be accompanied by the light emitted from the light emitter; and turn-on/off means for turning the light emitter on or off in synchronization with a sound of the specific part, on the basis of the designation data for designating the specific part.

In the system for sounding a music accompanied by light, the play data may be received through a network.

In the system for sounding a music accompanied by light, the network may be the Internet.

In the system for sounding a music accompanied by light, each part may comprise plural constituent components, the designation data ay designate a specific constituent component among the plural constituent components of the specific part, the specific constituent component being to be accompanied by the light emitted from the light emitter, and the turn-on/off means may turn the light emitter on or off in synchronization with a sound of the specific constituent component of the specific part, on the basis of the designation data for designating the specific constituent component of the specific part.

According to a second aspect of the present invention, there is provided a system for sounding a music accompanied by vibration comprising: a speaker for sounding a music comprising plural parts; vibrator for causing vibration; means for having the speaker sound the music, on the basis of music data of the music comprising the plural parts, the music data being included in play data containing both the music data of the music comprising the plural parts to be played by the speaker and designation data for designating a specific part among the plural parts, the specific part being to be accompanied by the vibration caused by the vibrator; and turn-on/off means for turning the vibrator on or off in synchronization with a sound of the specific part, on the basis of the designation data for designating the specific part.

In the system for sounding a music accompanied by vibration, the play data may be received through a network.

In the system for sounding a music accompanied by vibration, the network may be the Internet.

In the system for sounding a music accompanied by vibration, each part may comprise plural constituent components, the designation data may designate a specific constituent component among the plural constituent components of the specific part, the specific constituent component being to be accompanied by the vibration caused by the vibrator, and the turn-on/off means may turn the vibrator on or off in synchronization with a sound of the specific constituent component of the specific part, on the basis of the designation data for designating the specific constituent component of the specific part.

According to a third aspect of the present invention, there is provided a handy-phone terminal comprising the system for sounding a music accompanied by light.

According to a fourth aspect of the present invention, there is proved a handy-phone terminal comprising the system for sounding a music accompanied by vibration.

DETAILED DESCRIPTION OF THE PREFERRED EMBODIMENTS

Preferred embodiments according to the present invention will be described hereunder with reference to the accompanying drawings.

An embodiment of the present invention is a handy phone that has a WWW (World Wide Web) browser function; downloads play data having the music data of music comprising plural parts (MIDI (Musical Instrument Digital Interference) data or the like) from a WWW server through a network such as the Internet; uses as call-reception sounds the music sounds played on the basis of the play data; and turns on or off an LED and/or turning on or off a vibrator in synchronization with a specific part of the music sounds of indicated parts of the music. Here, a part means a part of a main melody, a part of an auxiliary melody, a part of an accompaniment or the like. Further, the synchronization of the turn-on/off operation of LED with the music sound of an specific part means that the LED is turned on when the music sound of the specific part is sounded and the LED is turned off when the music sound of the specific part is not sounded. The synchronization of the vibration of the vibrator with the music sound of a specific part means that the vibrator is vibrated when the music sound of the specific part is sounded and the vibrator is stopped when the vibration is stopped when the music sound of the specific part is not sounded.

The play data are extended in order to designate which LED should be synchronized with which part music sound in the music sounds comprising the plural parts and/or which part music sound in the music sounds comprising the plural parts the vibrator should be synchronized with. The play data thus extended contains designation data for making such an designation as described above. Even when the play data are MIDI data, the MIDI data is extended.

The handy phone terminal according to this embodiment is equipped with a tone generator for generating signals matched with musical notes of the music sound of each part in the play data when a music is played.

All the performances of sounding music, turning on/off the LED and turning on/off the vibrator can be synchronized with one another on the basis of the play data. However, any one or more of the performances may be prohibited by user's setting to the handy phone terminal.

Accordingly, music sound is played in order to notify a call-reception or the like, the LED and/or the vibrator can be operated in synchronization with any part of the music, so that reception of a call can be notified to a user with the turn-on/off operation of the LED and/or vibration, which is filled with high expression. Further, since the LED and/or the vibrator is operated in synchronization with any part, the type of call reception and the call originator can be identified even when the music is not played by the tone generator. In order to perform the identification, play data associated with call reception are switched in accordance with the type of the call reception.

Next, the operation of the embodiment according to the present invention will be described in detail with reference to FIGS. 1 to 6.

Figure 1:
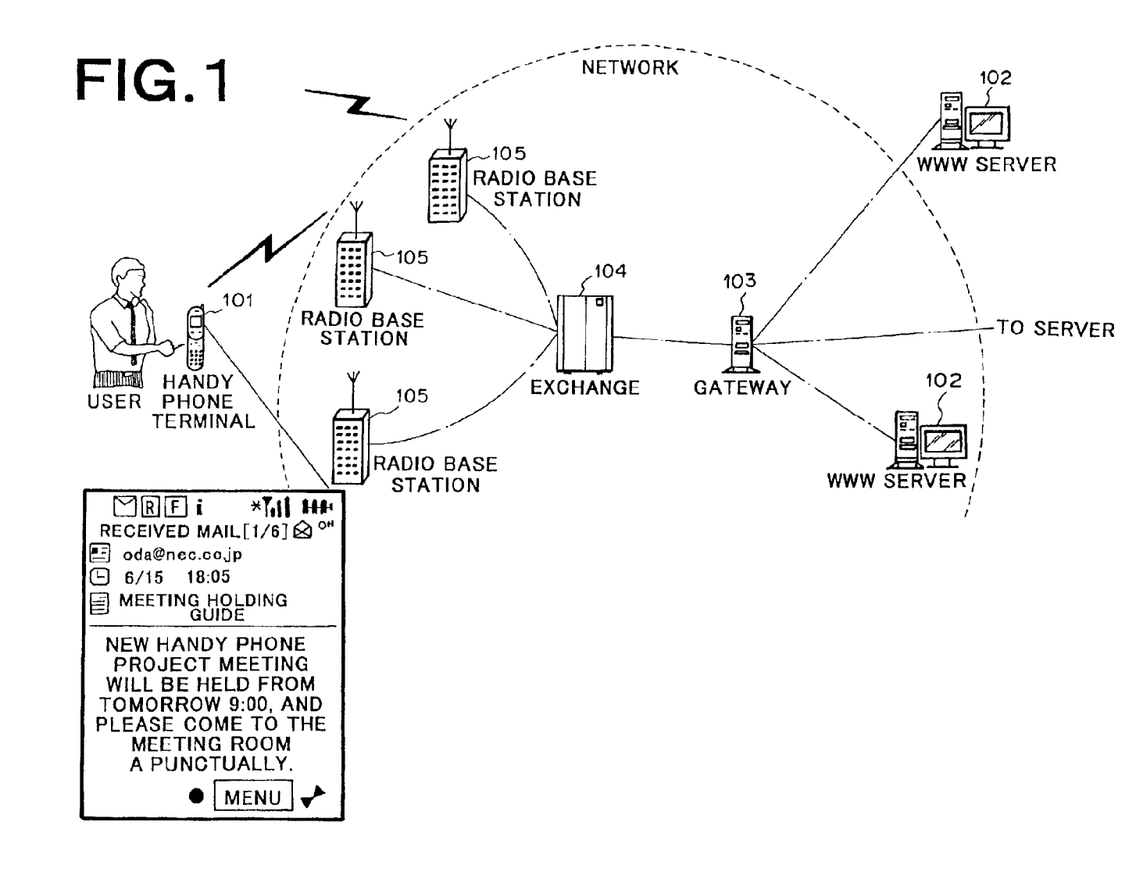
FIG. 1 is a diagram showing a handy phone terminal according to an embodiment of the present invention, and a device needed when the handy phone terminal downloads play data.

Referring to FIG. 1, a handy phone 101 downloads play data from a WWW server 102 through a gateway 103, an exchange 104 and any radio base station 105.

Figure 2:
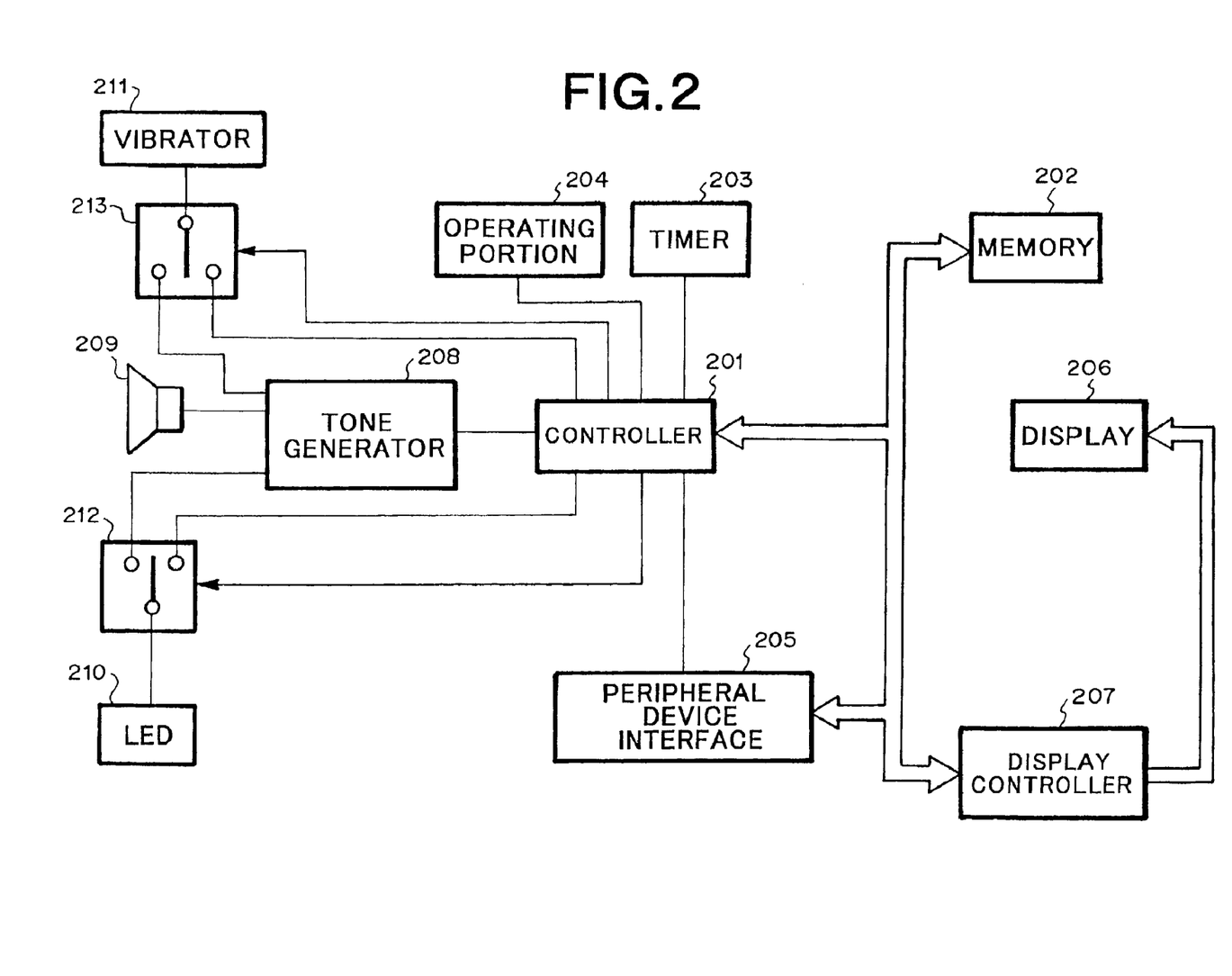
FIG. 2 is a block diagram showing the construction of the handy phone terminal according to the embodiment of the present invention.

Referring to FIG. 2, the handy phone 101 comprises a controller 201, a memory 202, a timer 203, an operating portion 204, a peripheral device interface 205, a display 206, a display controller 207, a tone generator 208, a speaker 209, LED 210, a vibrator 211 and switches 212, 213.

The controller 201 comprises a microprocessor, etc., and controls the respective parts such as the tone generator 20 of the handy phone, the switches 212, 213, etc. by executing programs stored in the memory 202. Further, the controller 201 carries out a method as described later with reference to FIG. 3.

The memory 202 comprises a ROM and a RAM. The ROM is used to store the programs to be executed by the controller 201 and data needed to execute the programs, and the RAM is used to temporarily store data. The RAM is backed up by a battery, and downloaded play data are stored in the RAM. The timer 203 comprises a counter or the like, and the timer 203 clocks the time and measures a lapse of a predetermined time and notifies the time and the lapse of the time to the controller 201.

The operating portion 204 comprises plural keys, and accepts an input of a telephone number and operations for various kinds of settings from a user. The peripheral device interface 205 serves to establish the interface between the handy phone and a personal computer or the like. The display 206 comprises LCD (Liquid Crystal Display) or the like, and displays a telephone number, the time, and characters to establish the interface with the user. The display controller 207 controls the display 206 for displaying the characters, etc. thereon, and the display controller 207 comprises a character generator, etc.

On the basis of the play data, the tone generator 208 makes the speaker 209 play the music sound of each part, makes the LED 210 turn on/off in such a way that the turn-on/off operation is synchronized with a specific part, and makes the vibrator 211 vibrate in such a way that the vibration is synchronize with a specific part. The speaker 209 makes sounds on the basis of an electrical signal transmitted from the tone generator 208.

The LED 210 emits light on the basis of an electrical signal input from the tone generator 208 or from the controller 201 through the switch 212, and the vibrator 211 vibrates on the basis of an electrical signal input from the tone generator 208 or from the controller 201 through the switch 213. The switch 212 switches a partner of the LED 210 to the tone generator 208 or the controller 201. The switch 213 switches a partner of the vibrator 211 to the tone generator 208 or the controller 201.

Figure 3:
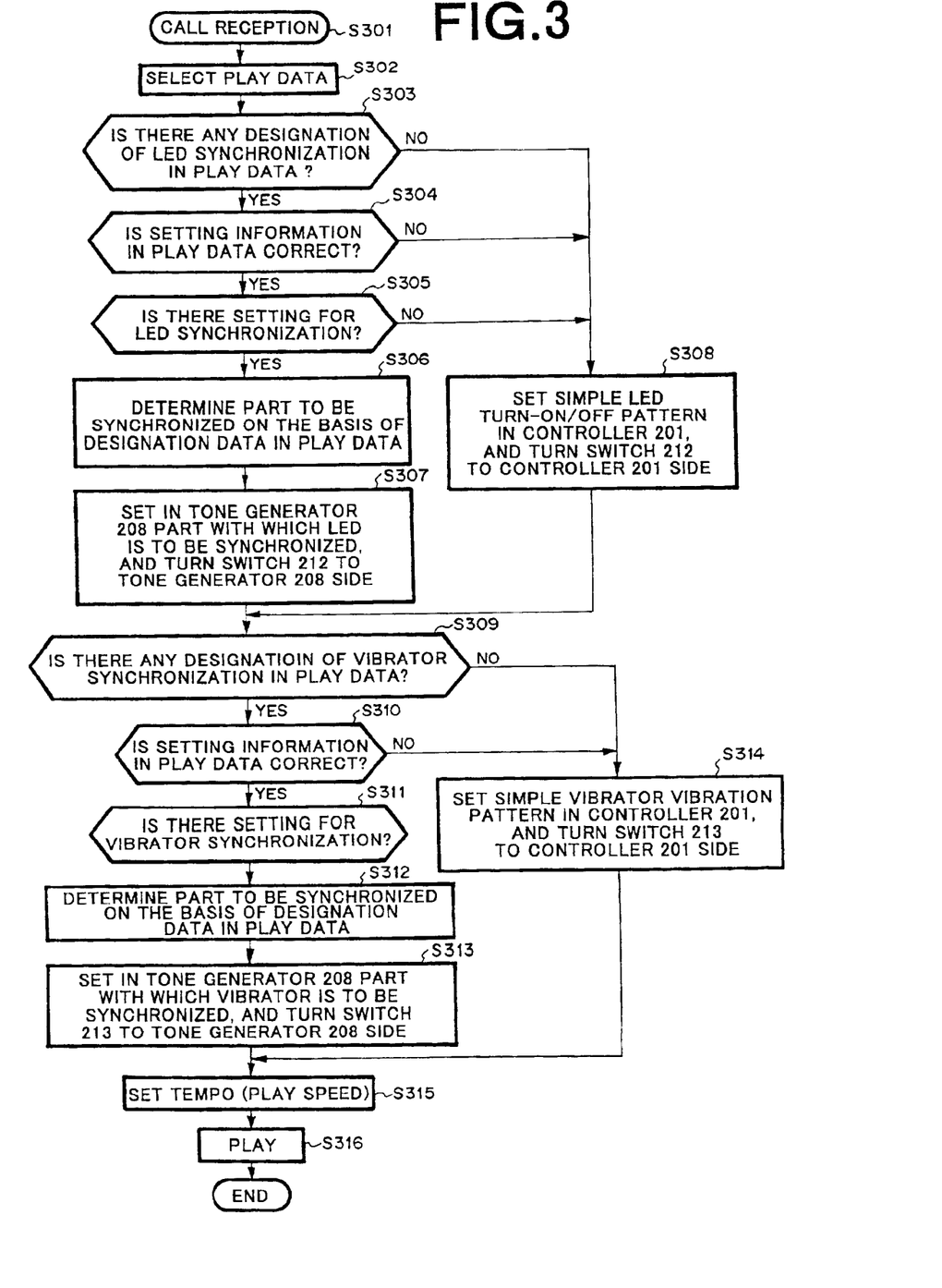
FIG. 3 is a flowchart showing the setting operation carried out by a controller 201 for taking or not taking synchronization between music play and each of LED and a vibrator after voices or data are received.

Next, the setting operation, which is carried out by the controller 201, for sounding a music and synchronizing or non-synchronizing the on/off operation of the LED 210 and/or the vibrator 211 with the music when a voice call or a data call is received will be described with reference to the flowchart of FIG. 3.

When the handy phone 101 receives a voice call or a data call (step S301), the controller 201 selects the play data associated with a call originator (step S302). Subsequently, the controller 201 judges whether or not a designation for synchronizing the turn-on/off operation of the LED with a music sound is contained in the play data in which the music data to be played is contained (step S303). If the judgment of step 303 is negative, that is, if there is no designation of the LED synchronization, a simple LED turn-on/off pattern for tuning LED on/off is set in the controller 201, and the switch 212 is switched to the controller 201 side (step S308).

If the judgment of step 303 is positive, the controller 201 judges whether the designation data for the LED synchronization in the play data are correct or not (step S304). If the judgment of the step S304 is negative, the processing goes to step S308.

If the judgment of step S304 is positive, the controller 201 judges whether or not the setting to the handy phone indicates that the LED synchronization is enabled (step S305). If the judgment of step S305 is negative, the processing goes to step S308.

If the judgment of step S305 is positive, the part with which the LED turn-on/off operation is to be synchronized is determined on the basis of the indicating data in the play data (step 306). Thereafter, the information on the part thus determined with which the LED turn-on/off operation is to be synchronized is set in the tone generator 208, and the switch 212 is switched to the tone generator (208) side (step S307). When the part with which the LED turn-on/off operation is to be synchronized is set in the tone generator 208, the tone generator 208 drives LED 210 to turns on/off when the tone generator 208 drives the speaker 209 to output the sound of the part.

Subsequently, the controller 201 judges whether a designation for synchronizing the turn-on/off operation of the vibrator with a music sound is contained in the play data in which the music sound to be played is contained (step S309). If the judgment of step S309 is negative, that is, if there is no designation of the vibrator synchronization, a simple vibrator turn-on/off pattern for the vibrator is set in the controller 201, and the switch 213 is switched to the controller 201 (step S314).

If the judgment of step S309 is positive, the controller 201 judges whether the designation data for the vibrator synchronization in the play data are correct or not (step S310). If the judgment of step S310 is negative, the processing goes to step S314.

If the judgment of step S310 is positive, the controller 201 judges whether or not the setting to the handy phone indicates that the vibrator synchronization is enabled (step S311). If the judgment of the step S311 is negative, the processing goes to step S314.

If the judgment of step S311 is positive, the part with which the vibrator turn-on/off operation is to be synchronized is determined on the basis of the indicating data in the play data (step S312). Thereafter, the information on the part thus determined with which the vibrator turn-on/off operation is to be synchronized is set in the tone generator 208, and the switch 213 is switched to the tone generator (208) side (step S313). When the part with which the vibration turn-on/off operation is to be synchronized is set in the tone generator 208, the tone generator 208 drives the vibrator 211 to turn on/off when the tone generator 208 drives the speaker 209 to output the sound of the part.

Subsequently, the controller 201 sets the tempo (playing speed) of the music sound in the tone generator 208 on the basis of the play data (step S315). Thereafter, the tone generator 208 sound the music and, if necessary, drives the LED 210 and the vibrator 211 on the basis of the setting in step S307 or step 308, step S313 or step S314 and step S315 and the music sound data in the play data (step S316).

If LED 210 is turned on or off in synchronization with a specific part of the music and/or the vibrator 211 is turned on or off in synchronization with a specific part of the music, the playing of the music sound from the speaker 209 may be stopped.

Figure 4:
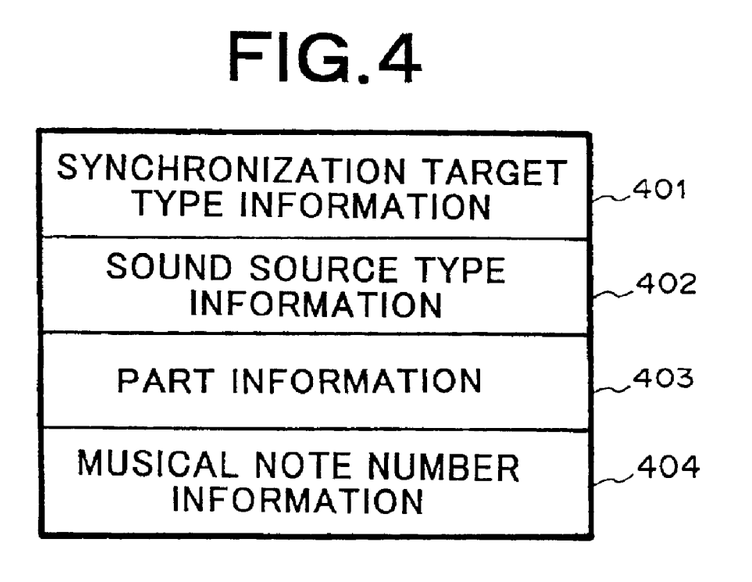
FIG. 4 is a diagram showing the format of indicating data according to the embodiment of the present invention.

FIG. 4 shows the format of the indicating data contained in the play data. The indicating data are classified into two types, one of which is for the LED synchronization and the other of which is for the vibrator synchronization. However, these types have the same format.

Referring to FIG. 4, the indicating data contain synchronization target type information 401, sound source type information 402, part information 403 and musical note number information 404.

The synchronization target type information 401 identifies whether the indicating data are for the LED synchronization or the vibrator synchronization. The sound source type information 402 identifies whether the constituent sound per part is a single sound or plural sounds. The part information 403 is used to indicate the part of the music with which the LED or the vibrator should be tuned, and the part information comprises an identifier of the part. The musical note number information 404 is valid only if the constituent sound per part comprises plural sounds, and the musical note number indicates with which constituent sound in the part indicated by the part information 403 LED or the vibrator is to be synchronized.

Figure 5:
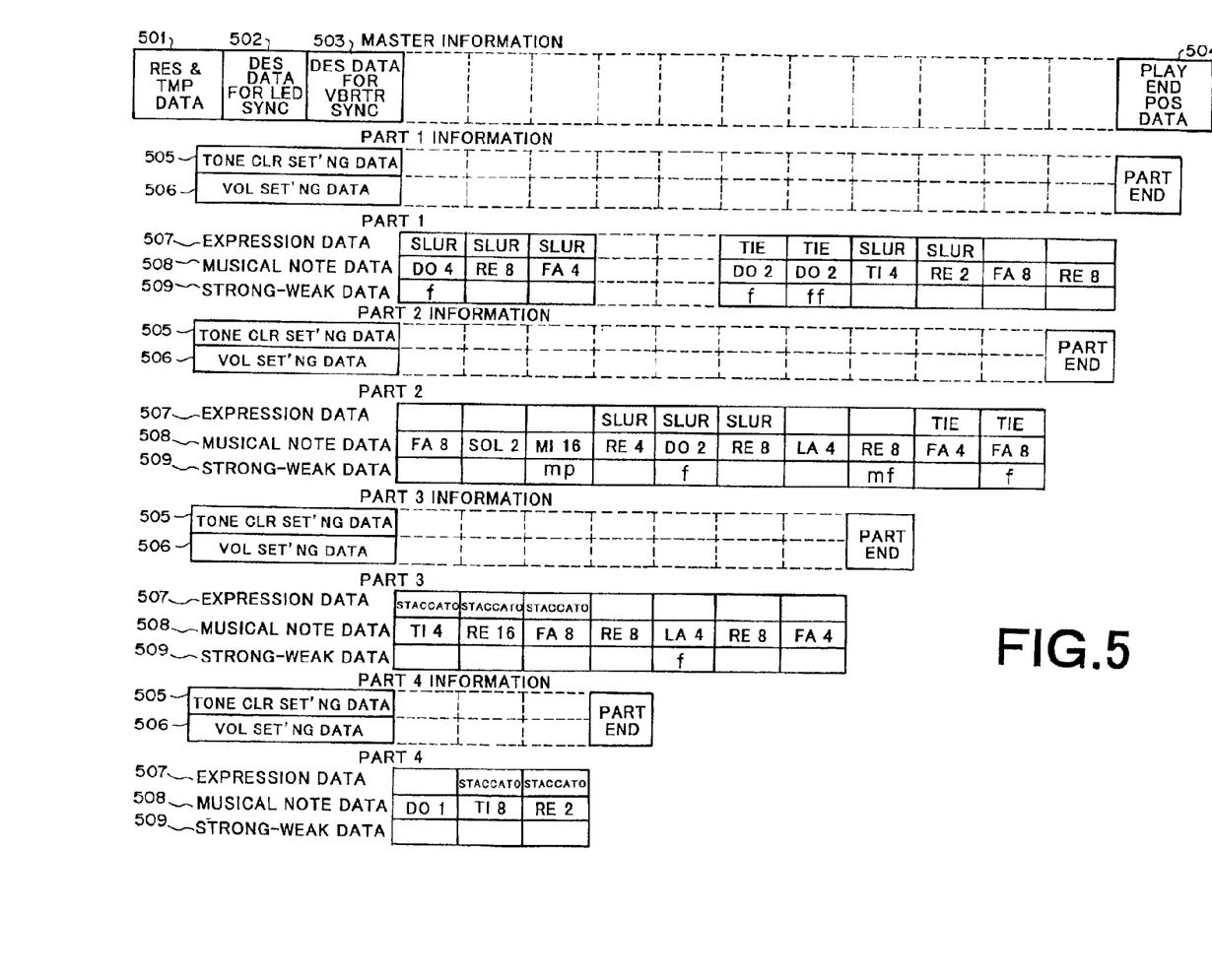
FIG. 5 is a diagram showing the format of music data when each part comprises a single sound in the embodiment of the present invention.

FIG. 5 shows the format of the play data in a case where each part comprises a single sound, that is, a single component.

Referring to FIG. 5, this format contains resolution & tempo data 501, indicating data 502 for LED synchronization, indicating data 503 for vibrator synchronization, play end position data 504, tone color setting data 505, volume setting data 506, expression data 507, musical note data 508, and strong-weak data 509. The resolution & tempo data 501, the play end position data 504, the tone color setting data 505, the volume setting data 506, the expression data 507, the musical note data 508, and the strong-weak data 509 are conventional data. The indicating data 502 for the LED synchronization and the indicating data 503 for the vibrator synchronization are newly added by the present invention, and these data have the format shown in FIG. 4.

Figure 6:
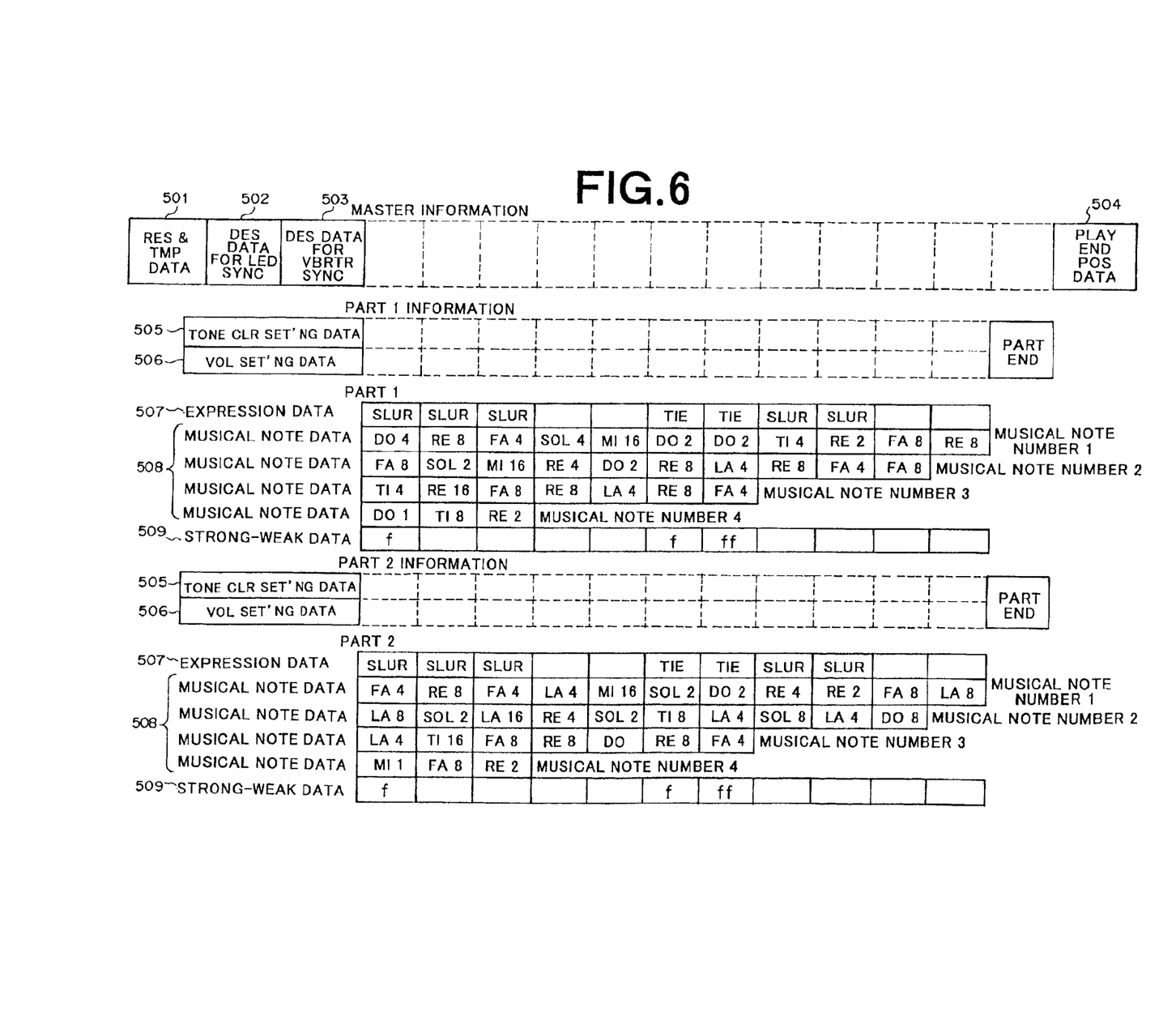
FIG. 6 is a diagram showing the format of play data when each part comprises plural sounds.

FIG. 6 shows the format of play data in a case where each part comprises plural sounds, that is, plural components.

Referring to FIG. 6, this format contains resolution & tempo data 501, indicating data 502 for LED synchronization, indicating data 503 for vibrator synchronization, play end position data 504, tone color setting data 505, volume setting data 506, expression data 507, musical note data 508, and strong-weak data 509. The resolution & tempo data 501, the play end position data 504, the tone color setting data 505, the volume setting data 506, the expression data 507, the musical note data 508, and the strong-weak data 509 are conventional data. The indicating data 502 for the LED synchronization and the indicating data 503 for the vibrator synchronization are newly added by the present invention, and these data have the format shown in FIG. 4.

There is the following difference between the format of FIG. 6 and the format of FIG. 5. In the format shown in FIG. 5, there is only single musical note data at the same timing per part, while in the format shown in FIG. 6, there are plural musical note data at the same timing per part. Further, there is a difference in a value of the sound source type information 402 in the indicating data 502, 503, and there is a difference that the musical note number information 404 is invalid or valid.

In the above-described embodiment, the indication of the call-reception in the handy phone terminal is described. However, the present invention is not limited to this embodiment, and the present invention may be applied to a mail terminal, a game terminal, etc.

In a case where the present invention is applied to the mail terminal, it may be considered that the present invention is applied to an identification of a mail transmitter when a mail is received, an identification of a mail transmitter when a mail is opened.

In a case where the present invention is applied to the game terminal, it may be considered that the present invention is applied to an identification of a specific game scene, output of effective sounds accompanied by LED turn-on/off or vibration/stopping of a vibrator.

As described above, according to the present invention, when a music downloaded from a server through a network is played when a call is received or the like, an LED can be turned on/off or the vibrator can be vibrated/stopped in synchronization with a specific part of the music. Therefore, even when such a music is used to indicate reception of a call, a call originator can be also identified on the basis of the LED turn-on/off pattern and/or the vibrating/stopping pattern of the vibrator.

Further, even if the handy phone is set so that no music sound is emitted, the call original can be identified on the basis of only the LED turn-on/off pattern and/or the vibrating/stopping pattern of the vibrator.

Still further, it is not necessary to provide the LED turn-on/off pattern data and the vibrating/stopping pattern data of the vibrator in addition to the music sound data, so that the memory capacity needed for the handy phone terminal can be more greatly reduced as compared with a case where these pattern data are required in addition to the music sound data, and also the download time can be more greatly shortened.

What is claimed is:

1. A system for sounding a music accompanied by light comprising:
    a speaker for sounding a music comprising plural parts;
    a light emitter for emitting light;
    means for having said speaker sound said music, on the basis of music data of said music comprising said plural parts, said music data being included in play data containing both said music data of said music comprising said plural parts to be played by said speaker and designation data for designating a specific part among said plural parts, said specific part being to be accompanied by said light emitted from said light emitter; and
    turn-on/off means for turning said light emitter on or off in synchronization with a sound of said specific part, on the basis of said designation data for designating said specific part.

2. The system for sounding a music accompanied by light as claimed in claim 1, wherein said play data are received through a network.

3. The system for sounding a music accompanied by light as claimed in claim 2, wherein said network is the Internet.

4. The system for sounding a music accompanied by light as claimed in claim 1,
    wherein each part comprises plural constituent components,
    wherein said designation data designate a specific constituent component among said plural constituent components of said specific part, said specific constituent component being to be accompanied by said light emitted from said light emitter, and
    wherein said turn-on/off means turns said light emitter on or off in synchronization with a sound of said specific constituent component of said specific part, on the basis of said designation data for designating said specific constituent component of said specific part.

5. A system for sounding a music accompanied by vibration comprising:
    a speaker for sounding a music comprising plural parts;
    a vibrator for causing vibration;
    means for having said speaker sound said music, on the basis of music data of said music comprising said plural parts, said music data being included in play data containing both said music data of said music comprising said plural parts to be played by said speaker and designation data for designating a specific part among said plural parts, said specific part being to be accompanied by said vibration caused by said vibrator; and
    turn-on/off means for turning said vibrator on or off in synchronization with a sound of said specific part, on the basis of said designation data for designating said specific part.

6. The system for sounding a music accompanied by vibration as claimed in claim 5, wherein said play data are received through a network.

7. The system for sounding a music accompanied by vibration as claimed in claim 6, wherein said network is the Internet.

8. The system for sounding a music accompanied by vibration as claimed in claim 5,
    wherein each part comprises plural constituent components,
    wherein said designation data designate a specific constituent component among said plural constituent components of said specific part, said specific constituent component being to be accompanied by said vibration caused by said vibrator, and
    wherein said turn-on/off means turns said vibrator on or off in synchronization with a sound of said specific constituent component of said specific part, on the basis of said designation data for designating said specific constituent component of said specific part.

9. A method for sounding a music accompanied by light from an apparatus comprising a speaker for sounding a music comprising plural parts, and a light emitter for emitting light, said method comprising:
    a sounding step of having said speaker sound said music, on the basis of music data of said music comprising said plural parts, said music data being included in play data containing both said music data of said music comprising said plural parts to be played by said speaker and designation data for designating a specific part among said plural parts, said specific part being to be accompanied by said light emitted from said light emitter; and a lighting step of turning said light emitter on or off in synchronization with a sound of said specific part, on the basis of said designation data for designating said specific part.

10. The method for sounding a music accompanied by light as claimed in claim 9, wherein said play data are received through a network.

11. The method for sounding a music accompanied by light as claimed in claim 10, wherein said network is the Internet.

12. The method for sounding a music accompanied by light as claimed in claim 9, wherein each part comprises plural constituent components, wherein said designation data designate a specific constituent component among said plural constituent components of said specific part, said specific constituent component being to be accompanied by said light emitted from said light emitter, and wherein said lighting step turns said light emitter on or off in synchronization with a sound of said specific constituent component of said specific part, on the basis of said designation data for designating said specific constituent component of said specific part.

13. A method for sounding a music accompanied by vibration from an apparatus comprising a speaker for sounding a music comprising plural parts and a vibrator for causing vibration, said method comprising:

a sounding step of having said speaker sound said music, on the basis of music data of said music comprising said plural parts, said music data being included in play data containing both said music data of said music comprising said plural parts to be played by said speaker and designation data for designating a specific part among said plural parts, said specific part being to be accompanied by said vibration caused by said vibrator; and a vibrating step of turning said vibrator on or off in synchronization with a sound of said specific part, on the basis of said designation data for designating said specific part.

14. The method for sounding a music accompanied by vibration as claimed in claim 13, wherein said play data are received through a network.

15. The method for sounding a music accompanied by vibration as claimed in claim 14, wherein said network is the Internet.

16. The method for sounding a music accompanied by vibration as claimed in claim 13, wherein each part comprises plural constituent components, wherein said designation data designate a specific constituent component among said plural constituent components of said specific part, said specific constituent component being to be accompanied by said vibration caused by said vibrator, and wherein said vibrating step turns said vibrator on or off in synchronization with a sound of said specific constituent component of said specific part, on the basis of said designation data for designating said specific constituent component of said specific part.

17. A handy-phone terminal comprising said system for sounding a music accompanied by light as claimed in claim 1.

18. A handy-phone terminal comprising said system for sounding a music accompanied by vibration as claimed in claim 5.

19. The method for sounding a music accompanied by light as claimed in claim 9, wherein said method is used as a call-reception indicating method.

20. The method for sounding a music accompanied by vibration as claimed claim 13, wherein said method is used as a call-reception indicating method.

21. A method for synchronizing one of light and vibration with music that includes a melody and a second part different from the melody, the method comprising the steps of:

providing music data that embodies music that has a melody and a second part different from the melody, the music data also including designation data that designates one of the melody and the second part as a specific part;

generating both the melody and the second part of the music with a tone generator based on the music data, and providing the generated music to a speaker;

recognizing the specific part of the music in the tone generator; and operating one of a light emitter and a vibrator in synchronization with the specific part of the music based on an output from the tone generator.

22. A system for synchronizing one of light and vibration with music that includes a melody and a second part different from the melody, the system comprising:

a speaker and a call indicator that is one of a light emitter and a vibrator;

a memory storing music data that embodies music that has a melody and a second part different from the melody, the music data also including designation data that designates one of the melody and the second part as a specific part;

a tone generator that generates both the melody and the second part of the music based on the music data from said memory, and that provides the generated music to said speaker, said tone generator recognizing the specific part of the music; and a switch that operates said call indicator in synchronization with the specific part of the music based on an output from said tone generator.

23. The system for sounding a music accompanied by light as claimed in claim 1, wherein said turn-on/off means turns said light emitter on or off in synchronization with a sound of said specific part in such a way that said light emitter is turned on when said specific part is sounded and said light emitter is turned off when said specific part is silent in said music on the basis of said designation data for designating said specific part.

24. The system for sounding a music accompanied by light as claimed in claim 4, wherein said turn-on/off means turns said light emitter on or off in synchronization with a sound of said specific constituent component of said specific part in such a way that said light emitter is turned on when said specific constituent component is sounded and said light emitter is turned off when said specific constituent component is silent in said music on the basis of said designation data for designating said specific constituent component of said specific part.

25. The system for sounding a music accompanied by vibration as claimed in claim 5, wherein said turn-on/off means turns said vibrator on or off in synchronization with a sound of said specific part in such a way that said vibrator is turned on when said specific part is sounded and said vibrator is turned off when said specific part is silent in said music on the basis of said designation data for designating said specific part.

26. The system for sounding a music accompanied by light as claimed in claim 8, wherein said turn-on/off means turns said vibrator on or off in synchronization with a sound of said specific constituent component of said specific part in such a way that said vibrator is turned on when said specific constituent component is sounded and said vibrator is turned off when said specific constituent component is silent in said music on the basis of said designation data for designating said specific constituent component of said specific part.

27. The method for sounding a music accompanied by light as claimed in claim 9, wherein said lighting step turns said light emitter on or off in synchronization with a sound of said specific part in such a way that said light emitter is turned on when said specific part is sounded and said light emitter is turned off when said specific part is silent in said music on the basis of said designation data for designating said specific part.

28. The method for sounding music accompanied by light as claimed in claim 12, wherein said lighting step turns said light emitter on or off in synchronization with a sound of said specific constituent component of said specific part in such a way that said light emitter is turned on when said specific constituent component is sounded and said light emitter is turned off when said specific constituent component is silent in said music on the basis of said designation data for designating said specific constituent component of said specific part.

29. The method for sounding a music accompanied by vibration as claimed in claim 13, wherein said lighting step turns said vibrator on or off in synchronization with a sound of said specific part in such a way that said vibrator is turned on when said specific part is sounded and said vibrator is turned off when said specific part is silent in said music on the basis of said designation data for designating said specific part.

30. The method for sounding music accompanied by light as claimed in claim 16, wherein said lighting step turns said vibrator on or off in synchronization with a sound of said specific constituent component of said specific part in such a way that said vibrator is turned on when said specific constituent component is sounded and said vibrator is turned of f when said specific constituent component is silent in said music on the basis of said designation data for designating said specific constituent component of said specific part.

* * * * *